No. 880,146. PATENTED FEB. 25, 1908.
E. E. LAMB.
CATTLE LANDER.
APPLICATION FILED AUG. 24, 1906.
4 SHEETS—SHEET 1.
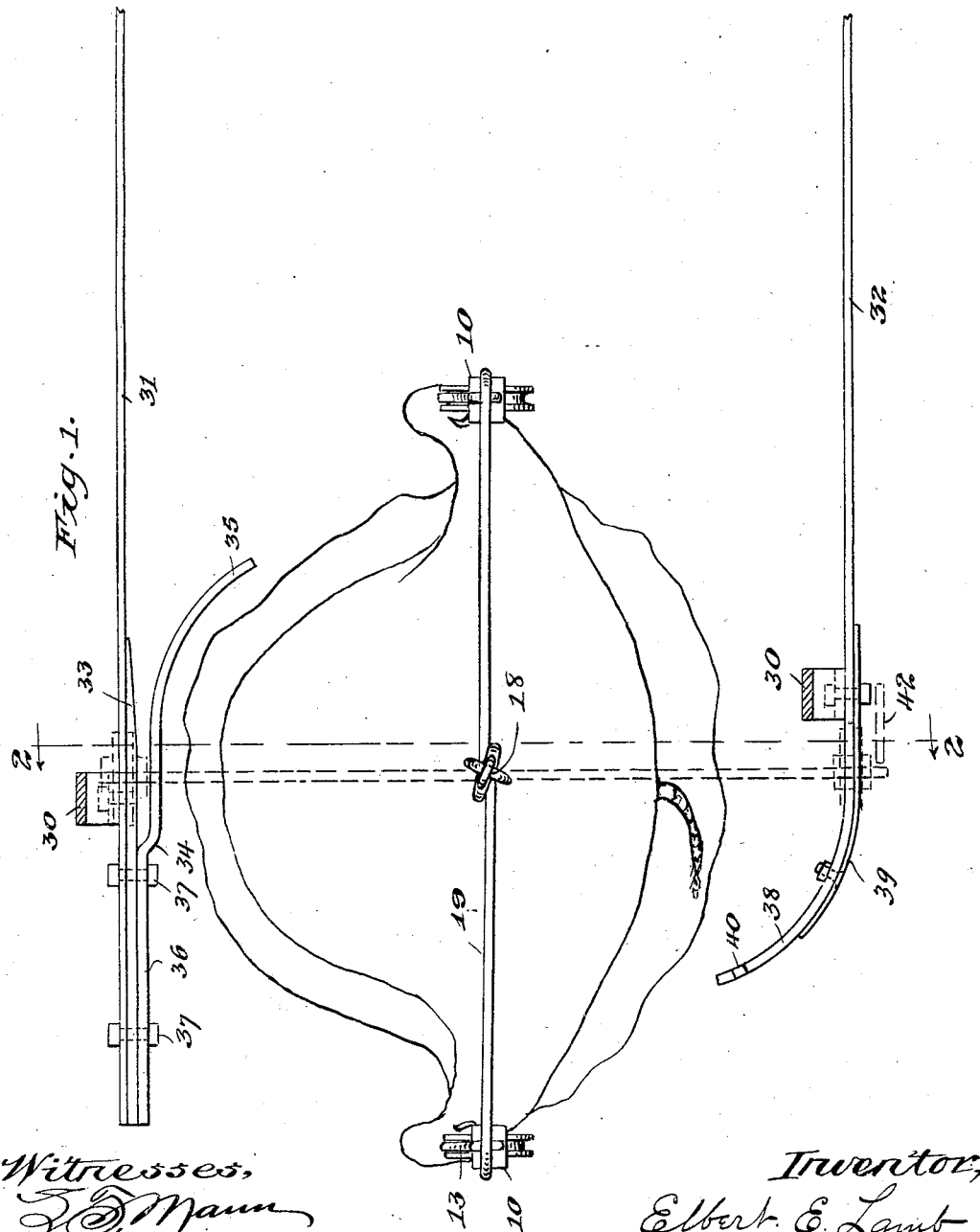
Witnesses,
Z. S. Mann
Walter M. Fuller
Inventor,
Elbert E. Lamb
By Offield Towle & Linthicum
Attys.

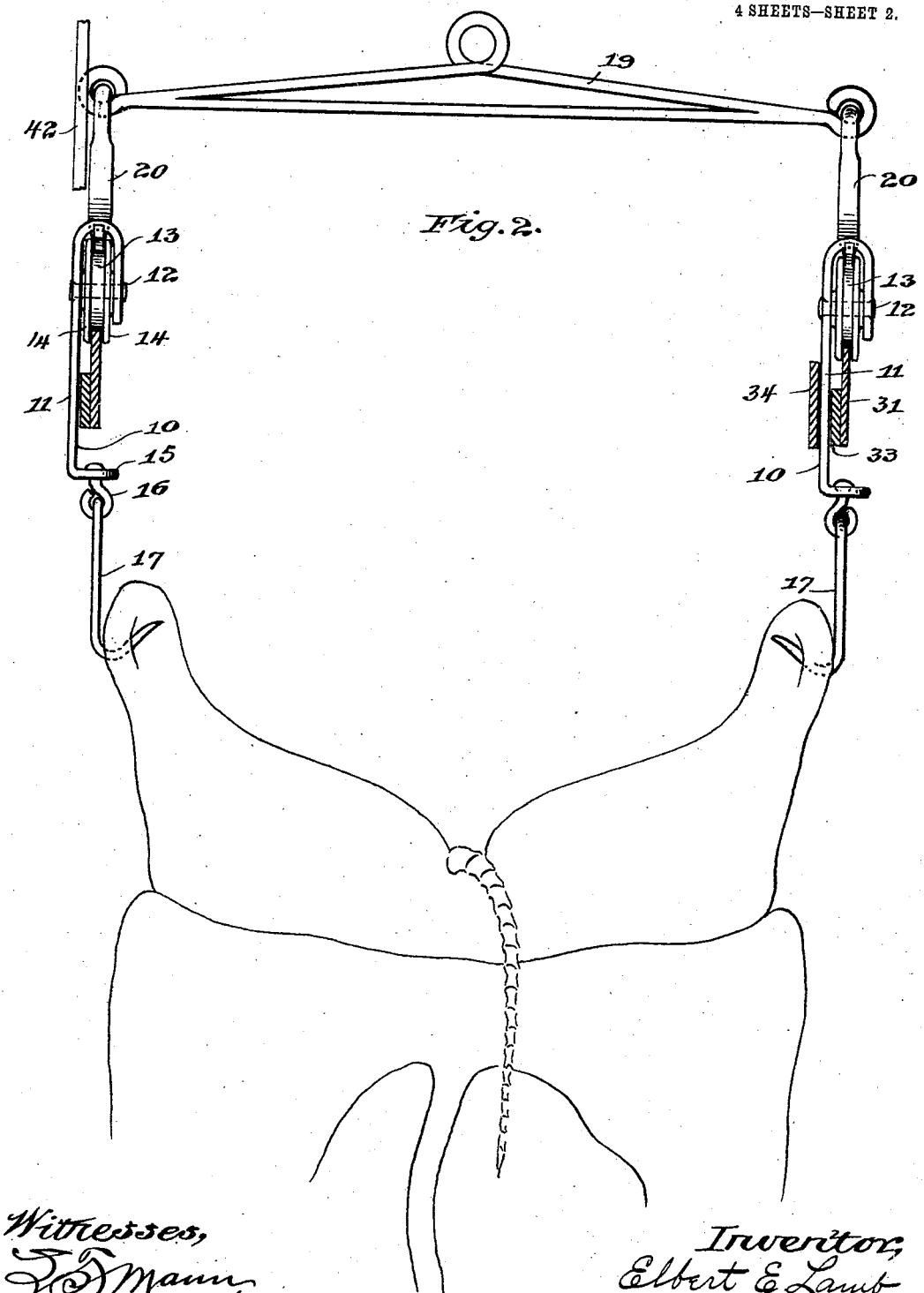

No. 880,146.
PATENTED FEB. 25, 1908.
E. E. LAMB.
CATTLE LANDER.
APPLICATION FILED AUG. 24, 1906.
4 SHEETS—SHEET 3.
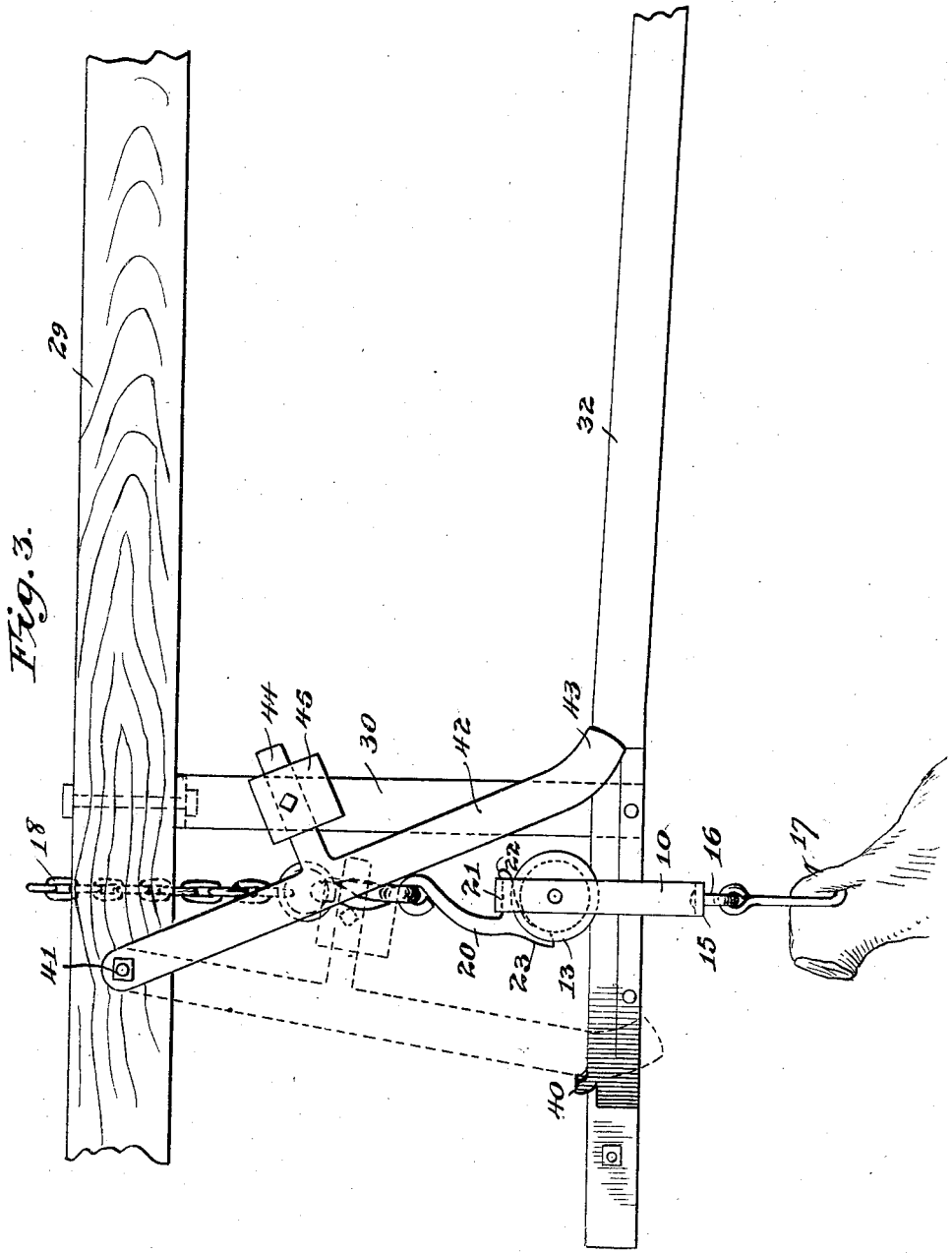
Witnesses,
Inventor,
Elbert E. Lamb
By Offield Towle & Linthicum
Attys.

No. 880,146. PATENTED FEB. 25, 1908.
E. E. LAMB.
CATTLE LANDER.
APPLICATION FILED AUG. 24, 1906.
4 SHEETS—SHEET 4.
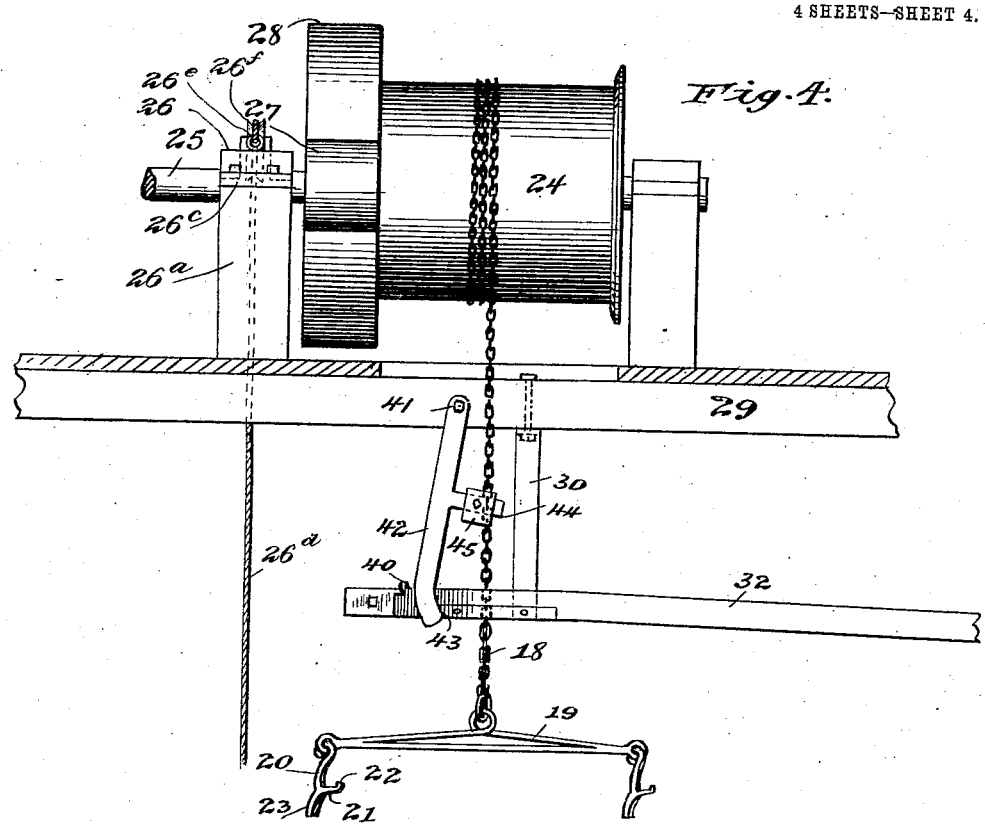
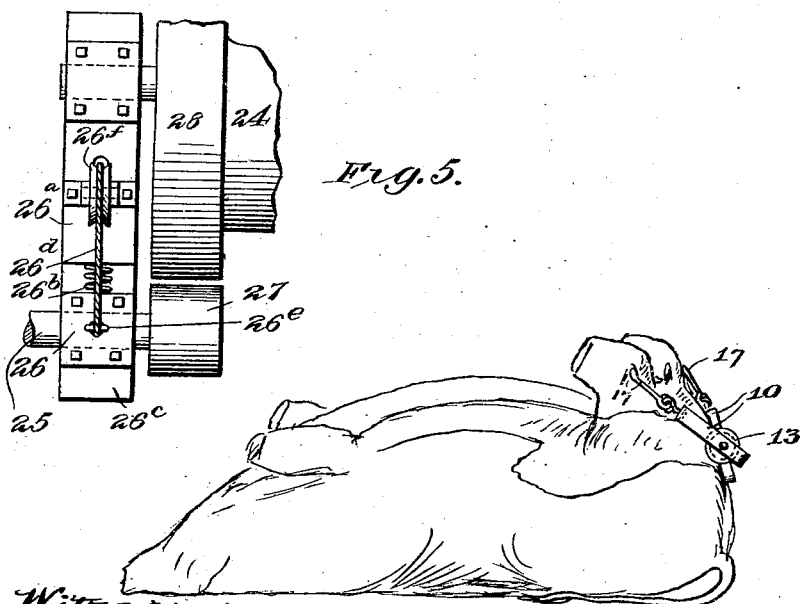
Witnesses,
Inventor,
Elbert E. Lamb
By Offield Towle & Linthicum
Atty's.

UNITED STATES PATENT OFFICE.

ELBERT E. LAMB, OF EAST ST. LOUIS, ILLINOIS.

CATTLE-LANDER.

No. 880,146.     Specification of Letters Patent.     Patented Feb. 25, 1908.

Application filed August 24, 1906. Serial No. 331,889.

*To all whom it may concern:*

Be it known that I, ELBERT E. LAMB, a citizen of the United States, residing at East St. Louis, in the county of St. Clair and State of Illinois, have invented certain new and useful Improvements in Cattle-Landers, of which the following is a specification.

My invention concerns cattle landers or devices for raising animals' bodies from the floor and landing them upon overhead tracks in order that they may be conveyed away thereon.

My improved device is especially adapted for use in handling the bodies of bullocks or steers and landing them upon a pair of tracks upon which the two partially severed halves of the body are transported. While the partly dressed steer lies upon the floor carriers provided with wheels are fastened to the gambs of the animal by means of sharp hooks mounted on the carriers. A spreader having a hook or support at each end detachably connected to the carriers is also employed and the carcass is raised between the tracks by any suitable hoisting means, such as a drum and chain, until the two carriers are above the tracks, when their wheels or rollers are brought over the tracks by turning or swinging around the body by hand. Then by allowing the chain and spreader to descend, the wheels of the carriers engage the two tracks, the hooks or supports on the spreader automatically release them, and the body travels off, the rollers moving down the tracks which are inclined enough for the purpose intended.

In order that the spreader may be readily and quickly lowered for a repetition of the hoisting operation I provide an automatically - actuated kick - off which turns the spreader around sufficiently so that it will escape the tracks, when it may be lowered as desired. One of the tracks is equipped with means for aiding in bringing the trolleys or carriers in proper position over the tracks, when the spreader and body are swung around, whereby the body can be raised and transferred to the tracks with despatch.

In the accompanying drawings I have illustrated the preferred embodiment of my invention, like reference characters referring to the same parts throughout the various views.

Figure 1 is a plan view of the tracks, and illustrates the animal in position to be hoisted so that the carriers or trolleys and spreader will not strike the tracks; Fig. 2 is a section through the tracks on line 2—2 of Fig. 1, as viewed in the direction indicated by the arrows, showing the spreader, carriers, and animal in the position taken after the carriers engage the tracks; Fig. 3 is a side elevation of the tracks illustrating the construction and operation of the automatic kick-off which comprises a weighted lever; and Fig. 4 is a view illustrating the tracks, kick-off and hoisting means. Fig. 5 is a partial or fragmentary plan view of the hoisting drum and the controlling mechanism for operating it.

The animal's body is delivered to my improved cattle lander in substantially the condition illustrated in Fig. 4, the animal having first been knocked in the head to render it senseless or unconscious, then raised upon a conveying track and suspended head downwards by a chain around its hind legs, the animal being stabbed or pierced with a knife in this condition so that the blood pours out from its neck, and, after having its head removed, the body is lowered to the floor of the slaughtering room. The body is then propped up on its back, its hide is removed from its legs and partially from its belly, and the lower half of each of its four legs is cut off. It is in this condition that the body is delivered to my improved cattle lander, as shown in Fig. 4, and is then ready to have the hooks of the carriers attached to its gambs.

Each carrier or trolley 10 comprises a bar 11 bent over at its top end to form supports for the two ends of a pivot pin 12 upon which the carrier or trolley wheel 13 is rotatably mounted. Wheel 13 has on its opposite edges flanges 14 which are intended to engage the two sides of the track upon which the wheel travels. At its lower end bar 11 is bent laterally to form the supporting offset portion 15 to which is fastened an eye-bolt 16 which sustains a sharp pointed hook 17 adapted to be thrust through the gamb of the animal.

On the bottom end of a hoisting and lowering chain or cable 18 is secured a spreader 19 equipped at each of its ends with a hook supporting member 20 which has a flat laterally extended part 21 adapted to extend beneath the loop or bent-over part of the upper end of bar 11 of one of the carriers above its wheel 13. The offset portion or seat 21 has at its outer end an upstanding stop or lug 22 intended to co-act with the front edge of bar 11 to prevent the carrier from being released from the hook 20 as long as the latter supports the carrier. Each hook 20 has a depending tail piece 23 designed to fit in the groove or space of the carrier wheel between its flanges to maintain the parts 21 and 22 in proper position in connection with the carrier. In other words, the engagement of tail piece 23 with the groove of its carrier wheel prevents the parts from twisting around or becoming locked together.

The upper end of chain 18 is secured to a drum 24 on which it is adapted to be wound up and from which it may be paid out to raise or lower the spreader and attached parts. In order to furnish power to operate this drum I provide a power-driven shaft 25 suitably mounted in one or more bearings and having at one end a friction wheel 27 to coöperate with a similar wheel 28 fastened to the drum. By manually-controlled mechanism, the drum's friction wheel 28 may be thrown into or out of engagement with the constantly rotating coöperating friction wheel 27, as desired. To accomplish this result, I mount bearing 26 of shaft 25 slidingly on the pillar or support 26$^a$ and provide an expansion spring 26$^b$ between the bearing and a shoulder of the support tending to push the bearing so as to move friction pulley 27 away from its companion pulley 28 of drum 24. A stop 26$^b$ limits the travel of the bearing. To move pulley 27 into operative relation and frictional contact with pulley 28 I provide a cord or rope 26$^d$ fastened at one end to an eye 26$^e$ on the bearing 26 and passed over a grooved pulley or sheave 26$^f$ down to a position where it may be grasped and pulled by the operator. By this means the rotation of drum 26 and the winding up of chain 28 is fully within the control of the operator.

Suitably supported from overhead beams 29, by means of any convenient number of depending hangers 30, is a pair of tracks 31 and 32 slightly inclined downwardly away from the portions adjacent to hoisting chain 18, the latter being disposed between the tracks near one end, as is shown in Fig. 1. On the inner side of track 31, which is preferably formed from an ordinary bar, is a narrower space bar 33, whose top edge is some little distance below the top of track 31 so as not to interfere with the flange of the carrier wheel, and inside of this bar is an offset guide bar 34 having an inwardly curved portion 35 diverging from the track and an offset part 36 parallel therewith, suitable bolts or rivets 37 fastening together the track, space bar 33, and guide bar 34. It should be noticed that the end of space bar 33 adjacent to the curved portion 35 of guide 34 is tapered toward the track 31 to assist in guiding the carriers, and that there is sufficient space between parts 33 and 35 to accommodate bar 11 of the carrier. The corresponding end of inclined track 32 is curved inwardly, as shown at 38, and is provided on its outer surface with a space bar 39 slightly thicker than the width of one of the flanges 14 of the carrier wheel. If desired the end 38 of track 32 may be split, and one portion bent upwardly to form a stop 40 so that the carrier cannot run off of this end of the track under abnormal conditions.

Above track 32 at the point 41 [Fig. 3] on beam 29 I pivot a kick-off bar 42 slightly curved at its lower end 43 and provided with a lateral extension 44 to which is fastened an adjustable weight 45 designed to normally maintain the depending bar 42 in the dotted position shown in Fig. 3, the bar, however, being capable of movement to the full line position when actuated by an end of spreader 19.

Assuming that the creature has been delivered to the landing device in the condition indicated in Fig. 4, an attendant secures carriers to its gambs by means of the sharp pointed hooks 17, and then supporting hooks 20 are attached to the carriers so that the upper bent-over portions of bars 11 rest upon the seats 21 with the upstanding projections 22 in front of the edges of the bars. By actuating the controlling mechanism of drum 24, chain 18, spreader 19, its hooks, the carriers, and the animal's body is raised sufficiently to enable the workmen to almost completely skin it and to permit them to remove the internal organs and split the carcass almost completely in two by cleaving lengthwise through its backbone. By further hoisting the spreader which is positioned to ascend between the tracks 31 and 32 by being maintained substantially parallel thereto, as shown in Fig. 1, may be lifted above the tracks, when, by a manual turning or swinging around of the animal's body, the carriers are brought over the tracks and positioned so that their wheels are exactly above the tracks, bar 35 by engaging bar 11 of one of the carriers operating to properly guide them to the position desired. Since the space bars 33 and 39 are of substantially the same width as the flanges all the wheels or treads of the wheels will be brought exactly above the top edges of the tracks. It should be understood that when thus swung around the lugs 22 of hooks 20 face the downwardly inclined tracks 31 and 32 whereby when the chain 18 is lowered the carriers engage the tracks and further descent of the chain disengages hooks 20 from the carriers, the stops 22 moving away from the front edges of the top bent portions of carrier bars 11 there being sufficient clearance between the top part of bars 11 and the wheels. Immediately upon the release of the carriers they roll down the tracks carrying the animal's body with them.

It will be understood from an inspection of the drawings that the spreader 19 when extended transversely to the tracks projects over them and could not be lowered without interfering with them. In order, therefore, to swing the spreader around to substantially the position indicated in Fig. 1 to permit its descent, the kick-off device is provided. When the spreader, carriers, and body are swung around to position the carriers above the tracks, one end of the spreader strikes the weighted kick-off bar 42 and moves it out of normal position to the full line position shown in Fig. 3, and, immediately upon the release of the carriers from supporting hooks 20, the kick-off bar swings back to normal position turning the spreader around so that it may be lowered without interfering with the tracks. Although the movement of kick-off lever 42 is not great, the momentum communicated to the spreader is sufficient to carry it around enough to be free from interference with the tracks when lowered.

Although this invention has been described in connection with the slaughtering of animals it is obviously capable of use in other lines of work, and a single track only may be employed successfully if desired.

I claim:

1. In a device of the character described, the combination of a track, a carrier adapted to be attached to and support a body to be transported, said carrier having a part adapted to travel on said track, means to raise and lower said carrier and permitting said carrier to be swung around, a guide to position the track-engaging portion of said carrier over said track as said carrier is swung around, whereby lowering of said carrier lands it upon said track, substantially as described.

2. In a device of the character described, the combination of a track, a carrier adapted to be attached to and support a body to be transported, a wheel rotatably mounted on said carrier and adapted to roll on said track, means to raise and lower said carrier and permitting said carrier to be swung around, a guide to position said wheel over said track as said carrier is swung around, whereby lowering of said carrier lands its wheel upon said track, substantially as described.

3. In a device of the character described, the combination of a track, a carrier designed to be attached to and support a body to be transported, a wheel rotatably mounted on said carrier adapted to roll upon said track, a supporting member adapted to be detachably connected to said carrier, said supporting member becoming detached from said carrier when lowered relatively thereto, means to raise and lower said supporting member and carrier and permit them to be swung around, a guide to position said wheel over said track as said supporting member and carrier are raised above said track and swung around, whereby lowering of said supporting member and carrier frees the latter from the former and lands its wheel upon the track, substantially as described.

4. In a device of the character described, the combination of an inclined track, a carrier designed to be attached to and support a body to be transported, a wheel rotatably mounted on said carrier and adapted to roll on said track, a hook to support said carrier and body, means to raise and lower said hook, carrier, and body and permit them to be swung around, a guide to position said wheel over said track when swung around, whereby upon lowering said hook, carrier, and body said wheel engages said track, said hook becomes automatically disengaged from said carrier, and the latter with the body travels down said inclined track, substantially as described.

5. In a device of the character described, the combination of a track, a carrier adapted to travel on said track and support a body to be transported, a supporting means to sustain said carrier, said supporting means having a connection with said carrier which is automatically disengaged and moved out of the path of travel of the latter on the track when said supporting means is lowered relatively to the carrier after the latter has engaged the track, and hoisting and lowering means for said supporting means, carrier, and body, substantially as described.

6. In a device of the character described, the combination of a pair of tracks, a pair of carriers adapted to travel one on each of said tracks and support one or more bodies, a spreader, a supporting means on each end of said spreader, to sustain one of said carriers and having a disengageable connection therewith which permits the carrier to be freed from said supporting means when the latter is lowered relatively to the former, and hoisting and lowering means to raise said spreader, supporting means, carriers, and body or bodies and lower them to permit the carriers to engage said tracks and disengage said supporting means from said carriers whereby the latter are free to travel on said tracks, substantially as described.

7. In a device of the character described, the combination of a pair of tracks, a pair of carriers adapted to travel one on each of said tracks and support one or more bodies to be transported, a spreader, a supporting means on each end of said spreader which extends beneath a part of one of said carriers to sustain the same and which has an upwardly projecting stop or lug adapted to extend in front of a part of the carrier, means to raise said spreader, supporting means, carriers, and body or bodies and lower them so that said carriers rest upon said tracks and said stops or lugs when said supporting means are lowered permitting said carriers to travel on said tracks freeing them from said supporting means, said raising and lowering means permitting said spreader and carriers to be swung around, and a guide to position said carriers over said tracks as said spreader and carriers are swung around, substantially as described.

8. In a device of the character described, the combination of a pair of tracks, a pair of carriers adapted to transport a body or bodies, each equipped with a flanged wheel to roll on one of said tracks, a spreader, a supporting means at each end of said spreader having a disengageable connection with one of said carriers, said supporting means becoming disengaged from said carriers when lowered relatively thereto, means to raise and lower said spreader, supporting means, carriers, and body or bodies, said raising and lowering means permitting said spreader and carriers to be swung around, a guide to bring said carriers over said tracks when raised above said tracks and swung around, and a space bar between said guide and one of said tracks to separate said guide and track sufficiently to accommodate one of the flanges of the wheel of the carrier which rides on said track, whereby lowering of said spreader, supporting means, carrier, and body or bodies lands said carrier wheels on said tracks and releases said carriers from said supporting means permitting them to travel on said tracks, substantially as described.

9. In a device of the character described, the combination of a pair of inclined tracks, a pair of carriers adapted to support a body or bodies and to travel one on each of said tracks, each of said carriers being equipped with a flanged wheel to roll upon one of said tracks with its flanges on opposite sides of the track to maintain it thereon, a spreader, a hook on each end of said spreader to engage and support one of said carriers, means to raise and lower said spreader, hooks, carriers, and body or bodies and permit them to be swung around, a curved guide associated with one of said tracks coöperating with one of said carriers to guide the wheels of said carriers over said tracks when swung around, and a space bar between said guide and its adjacent track to separate said guide and track sufficiently to accommodate a flange of the wheel of the carrier destined to travel on said track, whereby upon raising said spreader, hooks, carriers, and body or bodies between said tracks, swinging them around so that the wheels of said carriers will be guided over said tracks, and then lowering them, said hooks will automatically disengage said carriers, the latter landing upon and traveling down said inclined tracks supporting and carrying the body or bodies with them, substantially as described.

10. In a device of the character described, the combination of a rotatable drum, a chain adapted to be wound upon and unwound from said drum, a spreader attached to the free end of said chain, a hook secured to each of the two ends of said spreader, a tail piece depending from each of said hooks, a pair of carriers with which said hooks are adapted to coöperate, each of said carriers having a grooved wheel and a hook to engage the gamb of an animal, a pair of inclined tracks, a guide adapted to bring the grooved wheel of one of said carriers over one of said tracks when the animal is raised by said drum and chain and swung around to permit the wheels of both carriers to engage said tracks when the chain, spreaders, and carriers are lowered, said spreader hooks automatically releasing said carriers when their wheels land on said tracks, said tail pieces fitting into the grooves of said wheels and maintaining said spreader hooks and carriers in proper relation, and a kick-off comprising a weighted lever mounted adjacent to one of said tracks and in such position that it will be shifted out of normal position when said spreader and hooks are swung around to bring said carriers in position over said tracks, whereby when said spreader hooks are freed from said carriers said weighted lever will swing said spreader and spreader hooks to a position whereby they may be lowered by said chain unwinding from said drum without striking said tracks, substantially as described.

ELBERT E. LAMB.

Witnesses:
J. M. MAPES,
J. E. GILMORE.